United States Patent
Gurin

(10) Patent No.: US 7,313,926 B2
(45) Date of Patent: Jan. 1, 2008

(54) HIGH EFFICIENCY ABSORPTION HEAT PUMP AND METHODS OF USE

(75) Inventor: Michael H Gurin, Glenview, IL (US)

(73) Assignee: Rexorce Thermionics, Inc., Cuyahoga Falls, OH (US)

( * ) Notice: Subject to any disclaimer, the term of this patent is extended or adjusted under 35 U.S.C. 154(b) by 0 days.

(21) Appl. No.: 11/306,911

(22) Filed: Jan. 16, 2006

(65) Prior Publication Data
US 2007/0089449 A1  Apr. 26, 2007

Related U.S. Application Data

(60) Provisional application No. 60/593,485, filed on Jan. 18, 2005.

(51) Int. Cl.
*F25B 13/00* (2006.01)
(52) U.S. Cl. .................................. 62/324.2
(58) Field of Classification Search .......... 62/324.2, 62/476
See application file for complete search history.

(56) References Cited

U.S. PATENT DOCUMENTS

| | | | |
|---|---|---|---|
| 4,152,901 A | | 5/1979 | Munters |
| 4,439,994 A | * | 4/1984 | Briley .................. 62/101 |
| 4,467,621 A | | 8/1984 | O'Brien |
| 5,098,194 A | * | 3/1992 | Kuo et al. ............ 366/144 |
| 5,647,221 A | * | 7/1997 | Garris, Jr. ............. 62/116 |
| 5,873,260 A | | 2/1999 | Linhardt et al. |
| 5,899,067 A | | 5/1999 | Hageman |
| 5,946,931 A | | 9/1999 | Lomax et al. |
| 6,374,630 B1 | | 4/2002 | Jones |
| 6,434,955 B1 | | 8/2002 | Ng et al. |
| 6,442,951 B1 | * | 9/2002 | Maeda et al. ........... 62/94 |
| 6,539,728 B2 | | 4/2003 | Korin |
| 6,739,142 B2 | | 5/2004 | Korin |
| 6,918,254 B2 | | 7/2005 | Baker |
| 2002/0078696 A1 | | 6/2002 | Korin |
| 2003/0061823 A1 | * | 4/2003 | Alden .................. 62/115 |
| 2003/0182946 A1 | | 10/2003 | Sami et al. |
| 2003/0221438 A1 | | 12/2003 | Rane |
| 2005/0252235 A1 | * | 11/2005 | Critoph et al. ......... 62/480 |

\* cited by examiner

*Primary Examiner*—Melvin Jones

(57) ABSTRACT

A high efficiency absorption heat pump cycle is disclosed using a high pressure stage, a supercritical cooling stage, and a mechanical energy extraction stage to provide a non-toxic combined heat, cooling, and energy system. Using the preferred carbon dioxide gas with partially miscible absorber fluids, including the preferred ionic liquids as the working fluid in the system, the present invention desorbs the $CO_2$ from an absorbent and cools the gas in the supercritical state to deliver heat. The cooled $CO_2$ gas is then expanded, preferably through an expansion device transforming the expansion energy into mechanical energy thereby providing cooling, heating temperature lift and electrical energy, and is returned to an absorber for further cycling. Strategic use of heat exchangers, preferably microchannel heat exchangers comprised of nanoscale powders and thermal-hydraulic compressor/pump can further increase the efficiency and performance of the system.

23 Claims, 9 Drawing Sheets

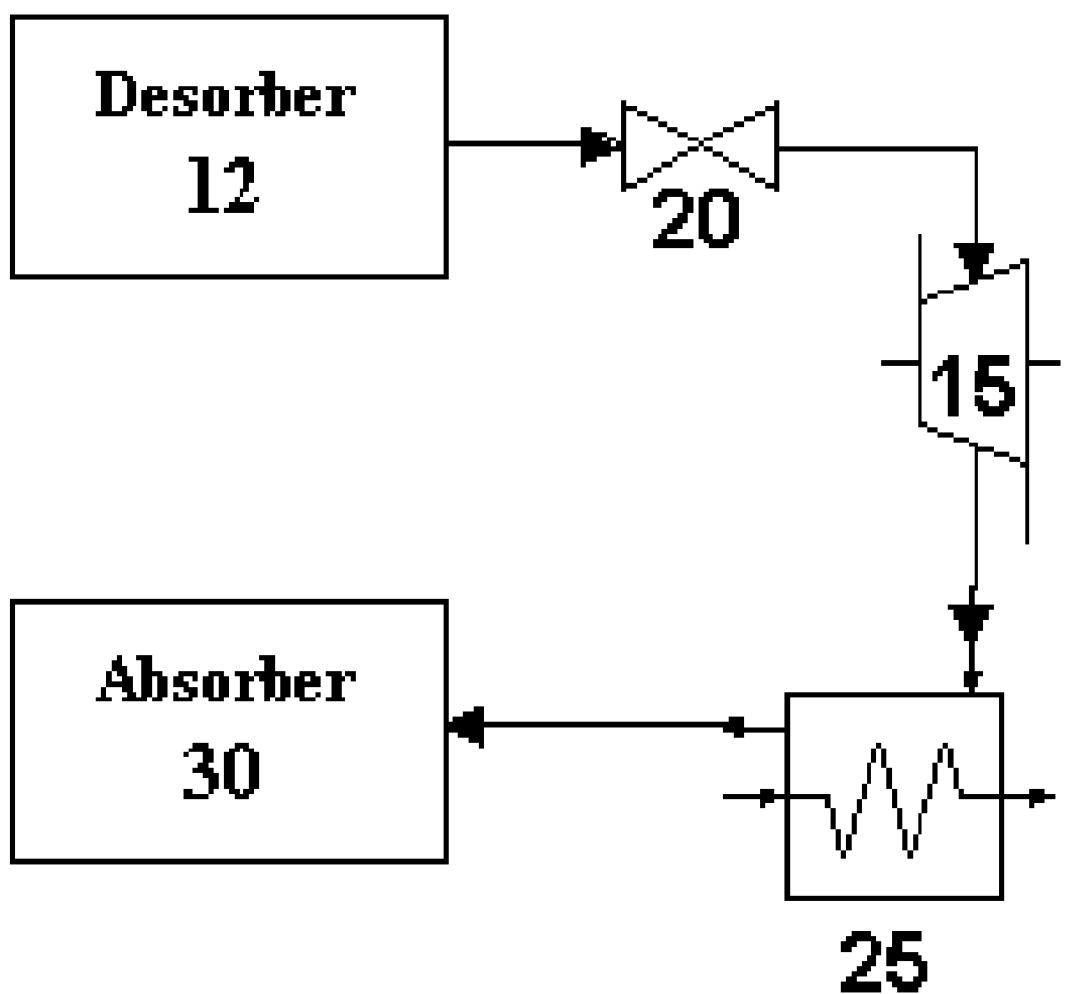

HIGH EFFICIENCY ABSORPTION HEAT PUMP AND METHODS OF USE

CROSS-REFERENCE TO RELATED APPLICATIONS

This application is a continuation-in-part of U.S. Patent Application Ser. No. 60/593,485 filed Jan. 18, 2005, having the title "High Efficiency Absorption Heat Pump and Methods of Use" and included as reference only without priority claims.

FIELD OF THE INVENTION

The invention is directed generally to heat pumps, and more specifically to a high pressure absorption heat pump using carbon dioxide and a low vapor pressure absorber as the circulating fluid.

DESCRIPTION OF RELATED ART

Heat pumps are well known in the art. A heat pump is simply a device for delivering heat or cooling to a system, whereas a refrigerator is a device for removing heat from a system. Thus, a refrigerator may be considered a type of heat pump. Throughout the application, the invention will be referred to as a heat pump with the understanding that the designation of refrigerator, air conditioner, water heater, trigeneration, and cogeneration could be substituted without changing the operation of the device. The inherent feature of a heat pump is to transport/move thermal energy from a heat source to a heat sink. The use of the term heat pump, thus is broadly applied as the transport of thermal energy from one enthalpy/entropy state to another. Thus, the utilization of heat pumps is not restricted to the generation of heating or cooling, but also for the intrinsic movement of thermal energy in virtually any thermodynamic cycle including means to convert such thermal energy into power generation (e.g., electrical or mechanical energy).

In absorption heat pumps, an absorbent such as water absorbs the refrigerant, typically ammonia, thus generating heat. When the combined solution is pressurized and heated further, the refrigerant is expelled. When the refrigerant is pre-cooled and expanded to a low pressure, it provides cooling. The low pressure refrigerant is then combined with the low pressure depleted solution to complete the cycle.

Many current absorption heat pump/refrigerators make use of either a water-ammonia couple, or a water-lithium bromide. These two absorption couples suffer from certain drawbacks. The water-ammonia couple raises security problems in view of the toxicity and flammability of ammonia, and LiBr is corrosive and very failure prone due to low pressure operation, i.e., small leaks create contamination. Moreover, the tendency to crystallize can be a clogging problem. Operating at very low pressures is often impossible due to the freezing of water. Other absorption processes have been proposed, but all involve working fluids that are toxic, flammable, ozone-depleting, or have high atmospheric greenhouse effects.

U.S. Pat. No. 6,374,630 titled "Carbon dioxide absorption heat pump" by Jones is a traditional absorption cycle utilizing supercritical carbon dioxide. This patent does not anticipate an absorber having either a very low vapor pressure, a boiling point less than 50.degree.C., nor any means to achieve a coefficient of performance better than 0.70. This patent further does not anticipate any non-thermal means to reduce desorption temperature, nor the extraction of expansion energy.

United States Patent Application No. 20030182946 Sami et al., titled "Method and apparatus for using magnetic fields for enhancing heat pump and refrigeration equipment performance" utilizes a magnetic field is operable to disrupt intermolecular forces and weaken intermolecular attraction to enhance expansion of the working fluid to the vapor phase. Magnetic field energy has been found to alter the polarity of refrigerant molecules and disrupt intermolecular Van der Waals dispersion forces between refrigerant molecules, though does not anticipate the utilization of a magnetic field to reduce desorption energy.

U.S. Pat. No. 6,434,955 titled "Electro-adsorption chiller: a miniaturized cooling cycle with applications from microelectronics to conventional air-conditioning" by Ng, et al. presents the combination of an absorption and thermoelectric cooling devices. The governing physical processes are primarily surface rather than bulk effects, or involve electron rather than fluid flow. This patent does not anticipate a continuous absorption process, but rather the transfer of thermal energy from a batch desorption process into the sequentially processed batch for subsequent desorption.

United States Patent Application No. 20030221438 titled "Energy efficient sorption processes and systems" by Rane, Milind V., et al. devises adsorption modules with heat transfer passages in thermal contact with the adsorption module wall and switchable heat pipes, adsorption module of this invention leads to lower cycle times as low as 5 minutes, efficient multi-stage regeneration processes, for regenerating liquid desiccant using rotating contacting disks. This patent does not anticipate either a continuous process nor an absorption process.

United States Patent Application No. 20020078696, titled "Hybrid heat pump" and U.S. Pat. No. 6,539,728 titled "Hybrid heat pump", both by Korin, is a hybrid heat pump system that includes (i) a membrane permeator having a permselective membrane capable of selectively removing vapor from a vapor-containing gas to yield a dry gas, (ii) a heat pump having (a) an internal side for exchanging thermal energy with a process fluid, (b) an external side for exchanging thermal energy with an external environment, and (c) a thermodynamic mechanism for pumping thermal energy between the internal side and the external side in either direction. Korin differs significantly by the use of membranes to pre-condition air in conjunction with a refrigeration air conditioning system, and not to perform any phase separation within the refrigerant itself. Furthermore, although membranes have been used in various separation applications, their use for heat pump systems has been limited. U.S. Pat. Nos. 4,152,901 and 5,873,260 propose to improve an absorption heat pump by using of semipermeable membrane and pervaporation membrane respectively. U.S. Pat. No. 4,467,621 proposes to improve vacuum refrigeration by using sintered metal porous membrane, and U.S. Pat. No. 5,946,931 describes a cooling evaporative apparatus using a microporous PTFE membrane. These patents do not anticipate the use of membranes for phase separation within absorption system, but rather adsorption systems.

U.S. Pat. No. 4,152,901 by Munters is a method and apparatus for transferring energy in an absorption heating and cooling system where the absorbent is separated from the working medium by diffusing the mixture under pressure through a semi-permeable membrane defining a zone of relatively high pressure and a zone of relatively low pressure higher than the ambient pressure. Munters does not anticipate supercritical operation, as it explicitly states that the "dilute solution of working medium is passed to the evaporator upon being depressurized, while the concentrated absorbent solution, upon being reduced to the ambient pressure, is passed into the sorption station".

U.S. Pat. No. 5,873,260 titled "Refrigeration apparatus and method" by Linhardt, et al. utilizes the pressure of absorbent/refrigerant solution is increased and the pressurized solution is supplied to a pervaporation membrane separator which provides as one output stream a vapor-rich refrigerant and as another output stream a concentrated liquid absorbent. Linhardt et al. do not anticipate supercritical fluids as explicitly stated "the pressure of the substantially vaporized refrigerant input to the absorber is less than 50 psia" and "the pressure of the absorbent/refrigerant solution entering the membrane separator is within the range of about 250 to 400 psia." Linhardt further notes that "Osmotic-membrane-absorption refrigeration cycles are also capable of reaching low temperatures and may have a COP higher than conventional ammonia/water heat-separation systems, but require very high pressures, of the order of 2,000 psia or more to force the refrigerant through the pores of the osmotic membrane." It is to be noted that a pervaporation membrane operates in a totally different fashion from the prior art membrane separation processes used in refrigeration and heat pump systems. Such prior art membrane systems rely on osmotic pressure to force the refrigerant through the membrane thereby separating the refrigerant from other constituents. For the ammonia-water pair, this conventionally requires pressures of the order of magnitude of 2,000 to 4,000 PSI and higher. Osmotic membranes are porous which allows the ammonia to pass through the membrane. Pervaporation membranes are not porous, but pass constituents through the membrane by dissolving the selected material into the membrane. This allows a much lower driving force, significantly less than 400 PSI, to act as the driver. In the case of an ammonia-water mixture, the pervaporation membrane, selectively passes ammonia and water vapor and rejects liquid water.

U.S. Pat. No. 6,739,142 titled "Membrane desiccation heat pump" by Korin is a system includes (a) a membrane permeator for removing vapor from a process gas and for providing a vapor-depleted process. This patent does not disclose the use of any supercritical fluids.

U.S. Pat. No. 6,918,254, by Baker on Jul. 19, 2005 titled "Superheater capillary two-phase thermodynamic power conversion cycle system" discloses a two-phase thermodynamic power system including a capillary device, vapor accumulator, superheater, an inline turbine, a condenser, a liquid pump and a liquid preheater for generating output power as a generator through the generation of a staggered or pulsed release of vapor flow. The capillary device, such as a loop heat pipe or a capillary pumped loop, is coupled to a vapor accumulator, superheater, the inline turbine for generating output power for power generation, liquid pump and liquid preheater. The capillary device receives input heat that is used to change phase of liquid received from the liquid preheater, liquid pump and condenser into vapor for extra heating in the superheater used to then drive the turbine. A superheater in combination with a liquid pump and preheater are implemented for use with the evaporator for improved thermal efficiency while operating at maximum cycle temperatures well below other available power conversion cycles. '254 requires a capillary device including loop heat pipes and pumped loop in order to increase the single working fluid (i.e., to achieve the pressure differential resulting from the gain in thermal energy) pressure in lieu of the traditional utilization of a compressor to increase pressure within a thermodynamic power conversion cycle. Furthermore, '254 utilizes the superheater stage to eliminate any liquid drops in order to avoid liquid impingement within turbine blades. '254 is also a low pressure device having low pressure differentials between the high pressure and low pressure stage as specifically noted by it's reference to capillary wicks with pores sizes of about one micron (commercially available) . . . can sustain a pressure differential of approximately ten psi. In conclusion, '254 does not enable the utilization of working fluids including fluids characterized as supercritical, binary composition, and/or non-toxic fluids. '254 is dependent on the utilization of a capillary device as a means to achieve a pressure differential.

U.S. Pat. No. 5,899,067 by Hageman on May 4, 1999 titled "Hydraulic engine powered by introduction and removal of heat from a working fluid" discloses a thermal source as a means to increase a working fluids pressure which in turn drives a piston for pumping, or alternatively refers to the piston being connected to a generator to result in electricity. '067 is dependent in it's operation of sequentially heating and cooling a fluid to enable the pressure on the piston to be increased by heating and then decreased by cooling to enable recovery from the fully expanded to fully compressed positions. '067 is both a low pressure device, utilizes a single working fluid, and being comprised of a moving piston has relatively very little surface area all resulting in slow power conversion rates and large physical size.

The art lacks a high efficiency, a system with a coefficient of performance greater than 0.7, environmentally friendly and efficient absorption cycle that uses a non-toxic, non-corrosive working fluid with a positive working pressure.

SUMMARY OF THE INVENTION

The present invention is a safe, environmentally friendly absorptive cooling, heating, and energy generation process. The process uses a carbon dioxide absorption cycle that utilizes a liquid, non-toxic absorbent such as ionic liquids, from which the carbon dioxide gas is absorbed. Only the carbon dioxide refrigerant is circulated to the evaporator and condenser heat exchangers, the components directly in contact with breathable air, thus avoiding a series of drawbacks associated with the absorber. The further incorporation of a thermodynamic hydraulic pump increases the energy efficiency, especially in combustion power generation cycles, as it eliminates a substantial portion of energy utilized for compression prior to combustion.

DESCRIPTION OF DRAWINGS

FIG. 10—A flowchart view of the absorption heat pump depicted with an expansion turbine configuration as the mechanical energy extraction device.

Figure 20:
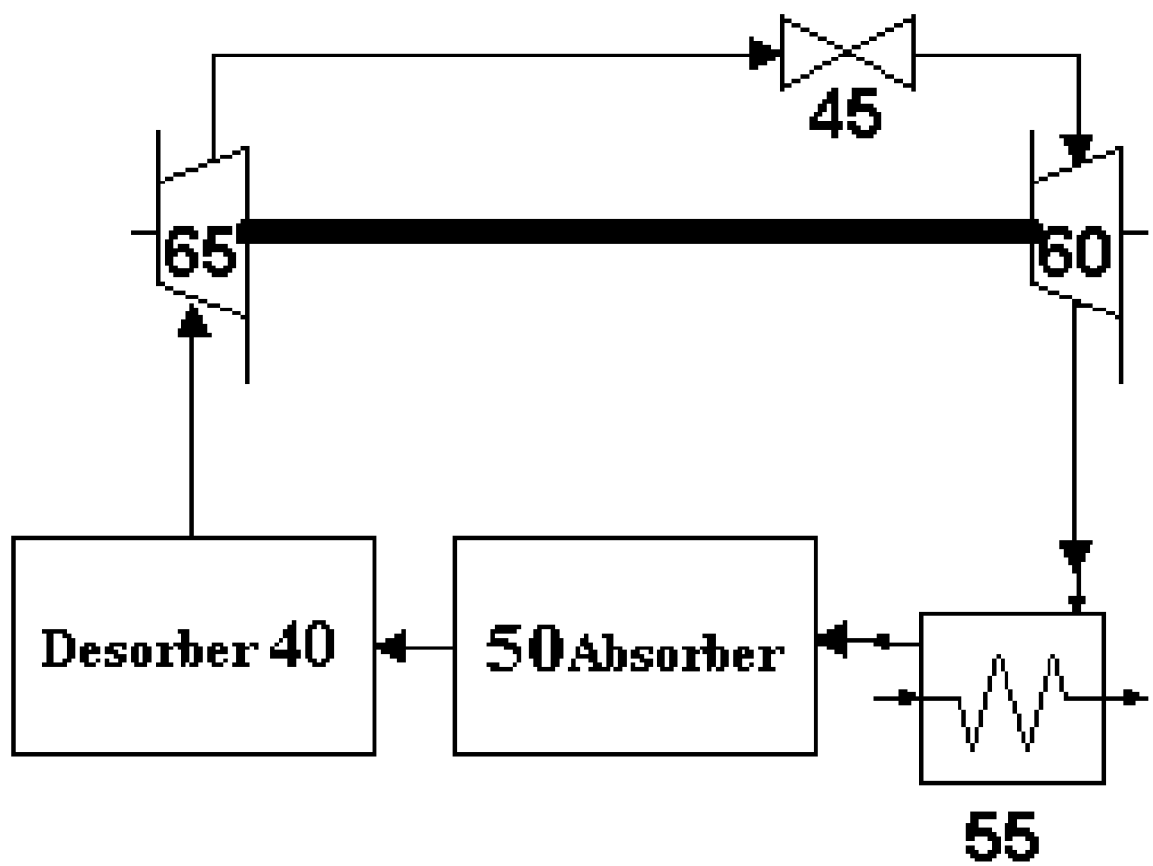
FIG. 20—A flowchart view of the absorption heat pump depicted with an expansion turbine configuration as the mechanical energy extraction device driving a vapor compression pump (i.e., compressor).

The inventive high efficiency absorption heat pump device, hereinafter also referred to as "ScHPX" is now set forth as a device principally comprised of a supercritical absorption heat pump, low vapor pressure absorbers and a series of integral components to achieve desorption using non-thermal means.

The ScHPX, an extension of the Champagne Heat Pump as developed by Jones, establishes novel methods to decrease the desorption temperature and total energy requirements to achieve desorption. The refrigerant, which is the circulating working fluid, is comprised of any environmentally friendly fluid (a.k.a. greenhouse friendly) whereby the fluid expands into a gas within the evaporator. A wide range of refrigerants, specifically those known in the art for absorption heat pumps are compatible with ScHPX. The preferred refrigerant is selected from the group of ammonia and carbon dioxide. The more preferred refrigerant is carbon dioxide, which has reduced toxicity and perceived safety. The specifically preferred refrigerant operates within the supercritical or transcritical range, as determined by the specific refrigerant.

The inventive heat pump also achieves superior desorption through a modified spinning disc reactor "SDR". SDR's have extremely high heat and mass transfer coefficients. The strong solution is simultaneously pumped into the centre of the disc and form a thin film as the liquid moves outwards. The centrifugal force creates intense interfering waves, which generate high heat transfer between the strong solution and the spinning disc. The SDR can also be used through the intense local mixing to accelerate the absorption of the supercritical $CO_2$ into the weak solution.

The ScHPX is further comprised of an absorber in which the refrigerant is absorbed as a method to either increase temperature lift (i.e., transform a relatively low temperature fluid to a higher temperature (a.k.a. higher quality) of a thermal source, or provide cooling. The energy requirements of an absorption system is limited to traditionally a thermal source for desorption, and mechanical or electrical energy to pump/pressurize the strong solution. A high efficiency absorption system, which is characterized in terms of coefficient of performance "COP", requires methods to reduce principally the desorption energy requirements. Desorption is effectively the process at which the refrigerant separates from the absorber.

The inventive ScHPX utilizes a range of absorbers selected from the group consisting of ionic liquids, ionic solids, electride solutions, and alkalide solutions. Ionic liquids and solids are recognized in the art of environmentally friendly solvents. Electride and alkalide solutions are recognized in the art of chemical reduction methods and oxidation methods respectively. ScHPX uniquely features ionic liquids "IL", which have very low if not negligible vapor pressure, preferably ionic liquids compatible with supercritical carbon dioxide "scCO2". The inventive combination of scCO2 and ILs have excellent carbon dioxide solubility and simple phase separation due to their classification as partially miscible fluid combinations. Partially miscible fluids are both miscible and immiscible as a direct function of both pressure and temperature. A partially miscible fluid in its immiscible state can be simply decanted for phase separation, which is inherently a low energy separation method. The phase behavior of $CO_2$ with ionic liquids and how the solubility of the gas in the liquid is influenced by the choice and structure of the cation and the anion.

Additional combinations of refrigerants and absorbers are recognized in the art as having partial miscibility. A further aspect of the inventions is the achievement of phase separation as a function of at least one function selected from the group consisting of temperature, pressure, and pH. The preferred solution further includes the utilization of small amounts of pH to vary solubility of the refrigerant within absorber. The more preferred solution varies temperature and pressure, in combination pH control using methods including electrodialysis. Additional methods to enable phase separation is the application of electrostatic fields, as electrostatic fields increase solubility of ionic fluids.

The inventive ScHPX further leverages electride and alkalide solutions. The preferred electride solution is comprised of ammonia. The principal benefit of electrides is centered around the transfer of free electrons (i.e., energy state) between the cathode and anode. An additional benefit, which is essential to the later incorporation of nanoscale powders, is the electride's strong reducing characteristics. This is essential as nanoscale powders, specifically metals, readily oxidize due in part to the powder's high surface area.

Yet another feature of the invention is the further inclusion of at least one nanoscale powder selected from of the group consisting of conductive, semi-conductive, ferroelectric, and ferromagnetic powders. Nanoscale powders, as recognized in the art, maintain colloidal dispersions while enhancing or varying a range of properties including magnetism, thermophysical properties (e.g., thermal conductivity), electrical conductivity, and absorption characteristics. The more preferred nanoscale powders are further comprised of nanoscale powders having nanoscale surface modifications, including surface modifications selected from the group of monolayer, and nanoscale multi-layers (i.e., surface coatings of less than 100 nanometers). The specifically preferred nanoscale powders enhance more than one parameter selected from the group consisting of thermophysical properties, electrical conductivity, and solar light spectrum absorption.

A yet further feature of the inventive ScHPX is the integration of mechanical energy extraction devices. The mechanical energy extraction devices enhance efficiency (i.e., COP) by extracting energy during the expansion stage of the refrigerant following the desorption step. The mechanical energy can be transformed into a wide range of useful forms of energy as known in the art, including an expansion turbine 15 as depicted in FIG. 10. These forms include transforming mechanical energy to electrical energy (e.g., alternating or direct current electricity generation), or driving pumps, compressors, or motors. These include energy extraction device selected from the group consisting of gerotor, Quasiturbine, piston, spherical engine, expansion turbine, expansion pump, Stirling cycle engine, Ericsson cycle engine, and ramjet turbine. The preferred mechanical extraction device leverages the refrigerants supercritical state, which features relatively high mass flow "density" and operations within the supersonic range. The more preferred mechanical extraction device is an integral supersonic device selected from the group consisting of compressor 65 as depicted in FIG. 20 and turbine 60 as depicted in FIG. 20. The specifically preferred device operates on either the ramjet or pulsejet principle. The result is a relatively compact high efficiency compressor or turbine for respectively inputting mechanical energy by pressurizing the strong solution or extracting mechanical energy by reducing the pressure during the expansion of the refrigerant.

As noted earlier, the most critical aspect to the efficiency in an absorption heat pump is the desorption energy. The ScHPX achieves desorption by the inventive combination of both non-thermal methods and traditional thermal methods. Traditional thermal methods, as known in the art, are achieved by simple heat transfer through air-to-liquid or liquid-to-liquid heat exchangers whereby a relatively hotter fluid transfers thermal energy to the relatively cooler strong solution. The preferred non-thermal methods are selected from the group consisting of magnetic refrigeration, vapor compression heat pump condenser, solar activated direct spectrum light absorption, electrostatic field, electrodialysis, membrane separation, electrodesorption, pervaporation, gas centrifuge, vortex tube $CO_2$-liquid absorber, and decanting. Membranes used for $CO_2$ removal do not operate as filters, where small molecules are separated from larger ones through a medium with pores. Instead, they operate on the principle of solution-diffusion through a nonporous membrane. The CO2 first dissolves into the membrane and then diffuses through it. Because the membrane does not have pores, it does not separate on the basis of molecular size. Rather, it separates based on how well different compounds dissolve into the membrane and then diffuse through it. An array of polyvinylchloride vinylacetate membranes, for example, allows for quicker permeation of $CO_2$. Very small molecules and highly soluble molecules, small molecules (e.g., $CO_2$) permeate faster than large molecules.

Membrane separation includes traditional ultra-filtration and nano-filtration as a method to separate components by means including molecular weight and particle size separation.

Figure 30:
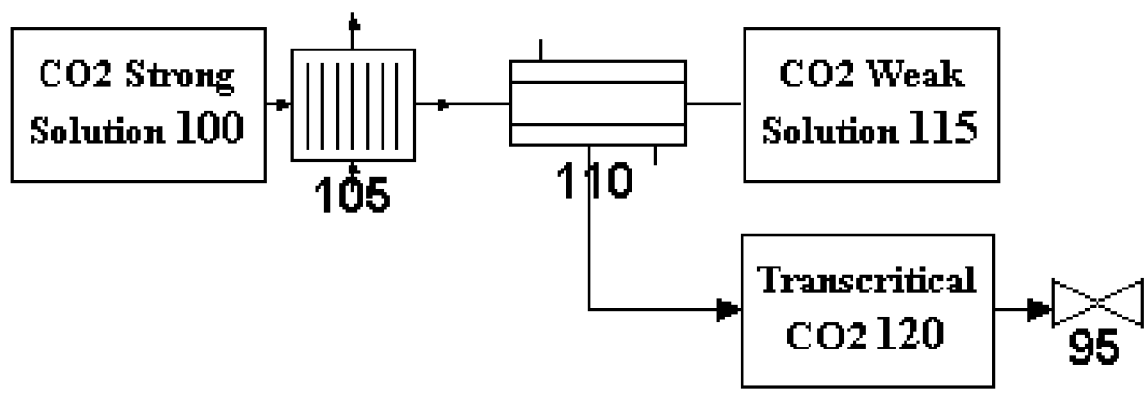
FIG. 30—A flowchart view of the absorption heat pump depicted with a magnetic refrigeration heat pump configuration as non-thermal means of increasing strong solution temperature.

The more preferred non-thermal method utilizes the combination of ferroelectric/ferromagnetic nanoscale powders in combination with magnetic refrigeration 105 as depicted in FIG. 30 that utilizes the magnetocaloric effect to raise the strong solution to higher than the desorption temperature, and the subsequent removal of the working fluid from the magnetic field decreases the now phase separated strong solution temperature without any heat exchangers. The specifically preferred implementation continuously and sequentially pulses the strong solution into at least two desorption zones. Sequentially pulsing the strong solution into the desorption zone enables a reduction of the pumping energy required to pressurize the strong solution into the desorption zone.

Yet another aspect of the invention is the absence of a compressor in the standard absorption design. The only moving part is limited to a very small, in terms of energy consumed as compared to total system energy, pump. The utilization of a free-piston pump offers the opportunity for high efficiency, quiet, low cost and oil free vapor compression. The absence of oil is critical in achieving benefits including avoidance of oil solubilizing in the preferred supercritical carbon dioxide, which presents significant complexities, and eliminating the oil boundary layer created on the heat transfer surfaces, which presents a deterioration of heat transfer. An ultra high COP ScHPX does incorporate a vapor compression stage as a method to achieve COPs comparable and beyond the highest vapor compression heat pumps. The preferred compressors are also oil-free, which is achieved by incorporating many techniques as known in the art for reducing friction, including diamond coatings, diamond like coatings, ultrafine diamond coatings, air bearings, magnetically levitation and solid lubricants.

Figure 40:
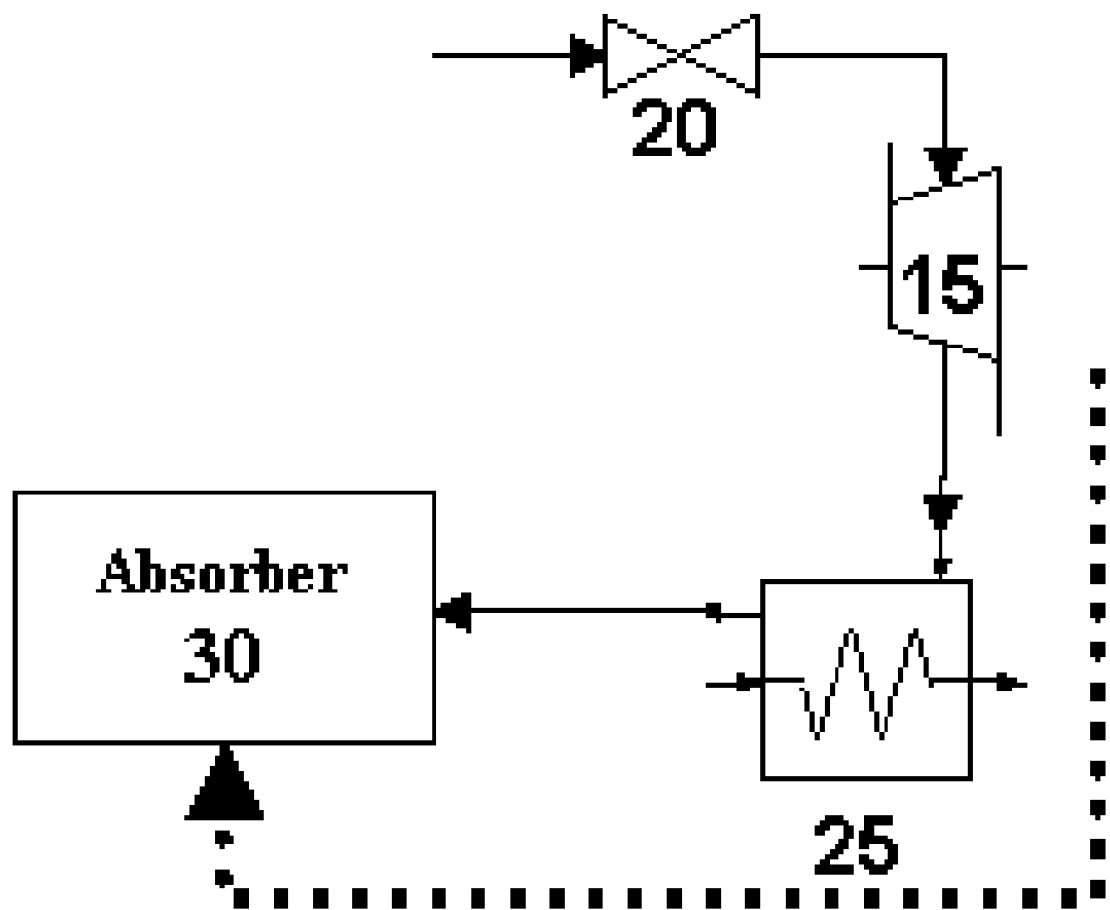
FIG. 40—A flowchart view of the absorption heat pump depicted with a sealed containment of an expansion turbine configuration FIG. 50—A flowchart view of the absorption heat pump depicted with a multiple stage heat pump system's condenser pre-heating strong solution.

Another aspect of the invention further avoids the complexities associated with leak-free pumps or compressors. The ScHPX thus further includes a sealed container 35 as depicted in FIG. 40, whereby the sealed container captures refrigerant leaked by pumping system that is periodically evacuated into the weak solution. The sealed container captures low pressure strong solution which is leaked into the sealed container. A controller monitors the pressure within the sealed container to determine when a control valve is switched whereby the pump between the absorber and desorber, which normally pressurizes the strong solution into the desorber, now pressurizes the losses into the sealed container into the absorber.

The physical size and the rate of absorption is yet another critical component of any absorption system. The inventive ScHPX further includes a cavitation device, whereby the cavitation device enhances the absorption rate by creating micro-bubbles with significantly greater surface area. The more preferred cavitation device is selected from the category of devices that create hydrodynamic cavitation.

Physical size of the ScHPX is further reduced by the utilization of microchannel heat exchangers, whereby the supercritical fluids have reduced surface tension that counteract the fluid friction associated with high surface area heat exchangers.

ScHPX System Configuration

Figure 50:
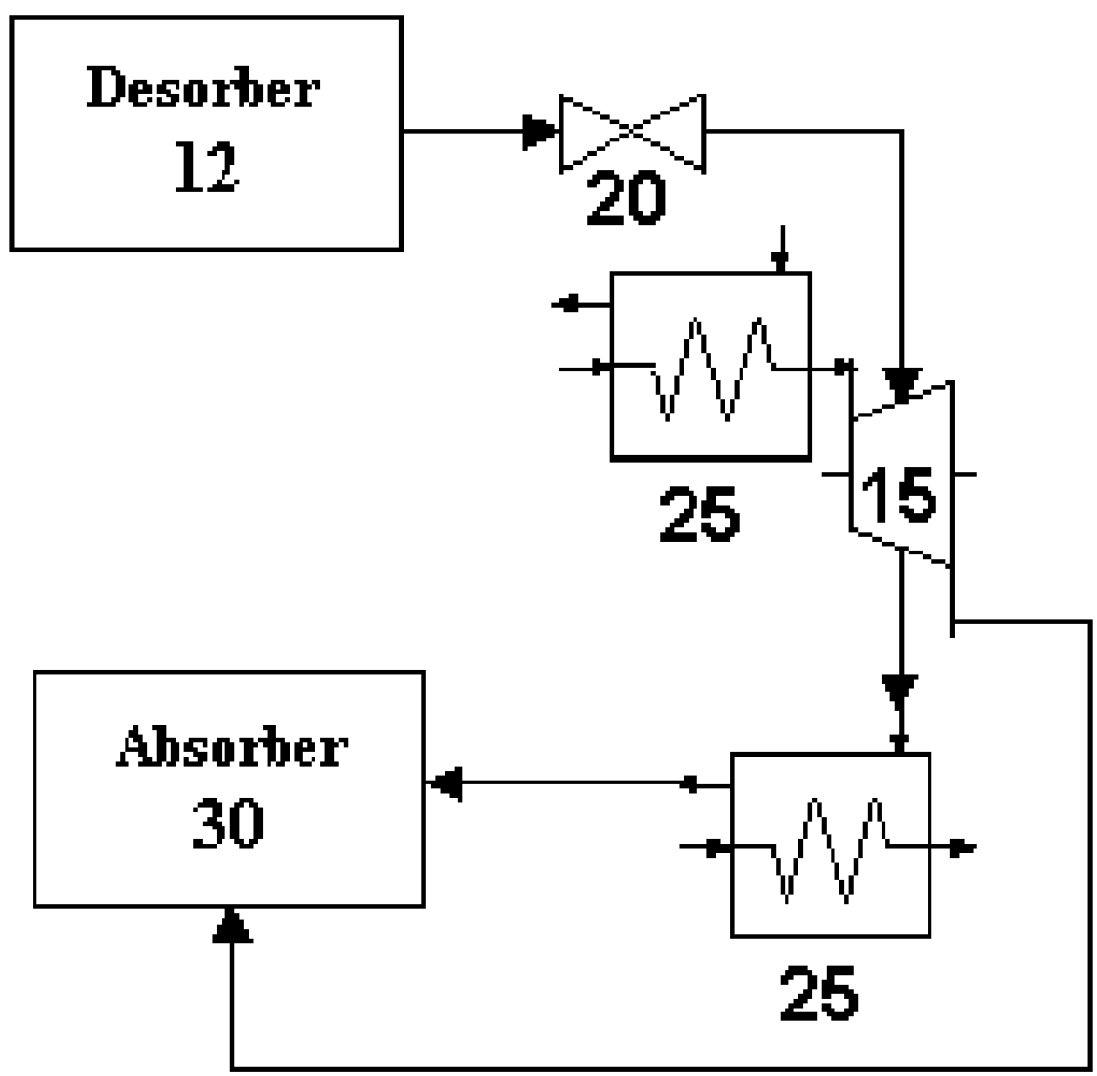

The inventive ScHPX is unique not only due to specific components but also in terms of operational configuration. A multistage absorption heat pump system, also known as a cascading system, whereby one distinct refrigerant A is used in at least one distinct stage and at least one other distinct refrigerant B is used in at least one other distinct stage. Each stage is in effect a distinct thermodynamic cycle, though each stage is coupled to the other as one's output is the other's input. The preferred ScHPX leverages the differences in desorption temperature of a refrigerant A and absorption temperature of refrigerant B. In other words, the condensing temperature (i.e. condenser A 25 as depicted in FIG. 50) of one stage is the desorption temperature of the other stage (i.e. condenser B 25 as depicted in FIG. 50).

Yet another configuration is the ScHPX having direct infusion of a parallel energy generation system or combustor such that it's exhaust is infused into absorber. One key advantage is the capture of latent energy from the exhaust stream. A more preferred implementation utilizes techniques as known in the art to selectively enable the refrigerant to enter the absorber, thus the exhaust air is treated to remove byproducts, whereby byproducts include NOx and sulfur. This implementation achieves concurrent carbon dioxide sequestration. The cooling available from the ScHPX is then utilized to precool the combustion air to increase turbine capacity and energy efficiency.

Figure 60:
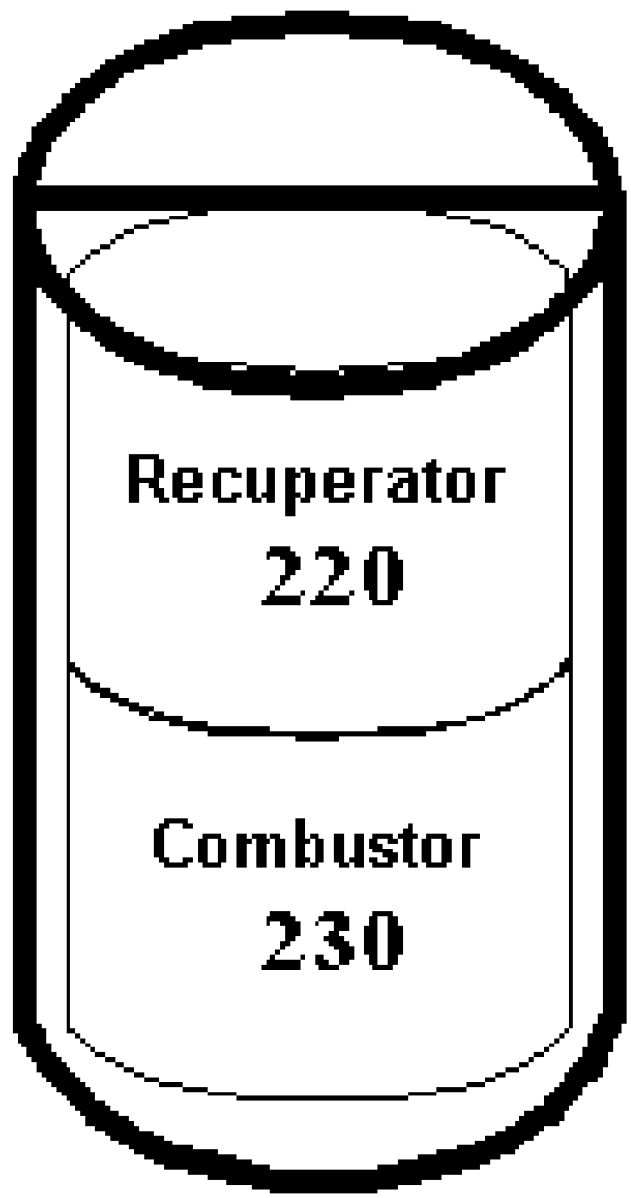
FIG. 60—A three dimensional view of the absorption heat pump depicted with a pre-heating of strong solution through the containment of combustor and recuperator.

A further gain in efficiency is obtained by capturing thermal energy directly recovered from thermal conduction losses of a combustion chamber 230 as depicted in FIG. 60 and combustion recuperator 220 as depicted in FIG. 60. Recuperators are often utilized to capture waste heat, though thermal conduction through the external walls of the recuperator limit total energy recovered, especially for space constrained implementations such as mobile vehicle applications.

Figure 70:
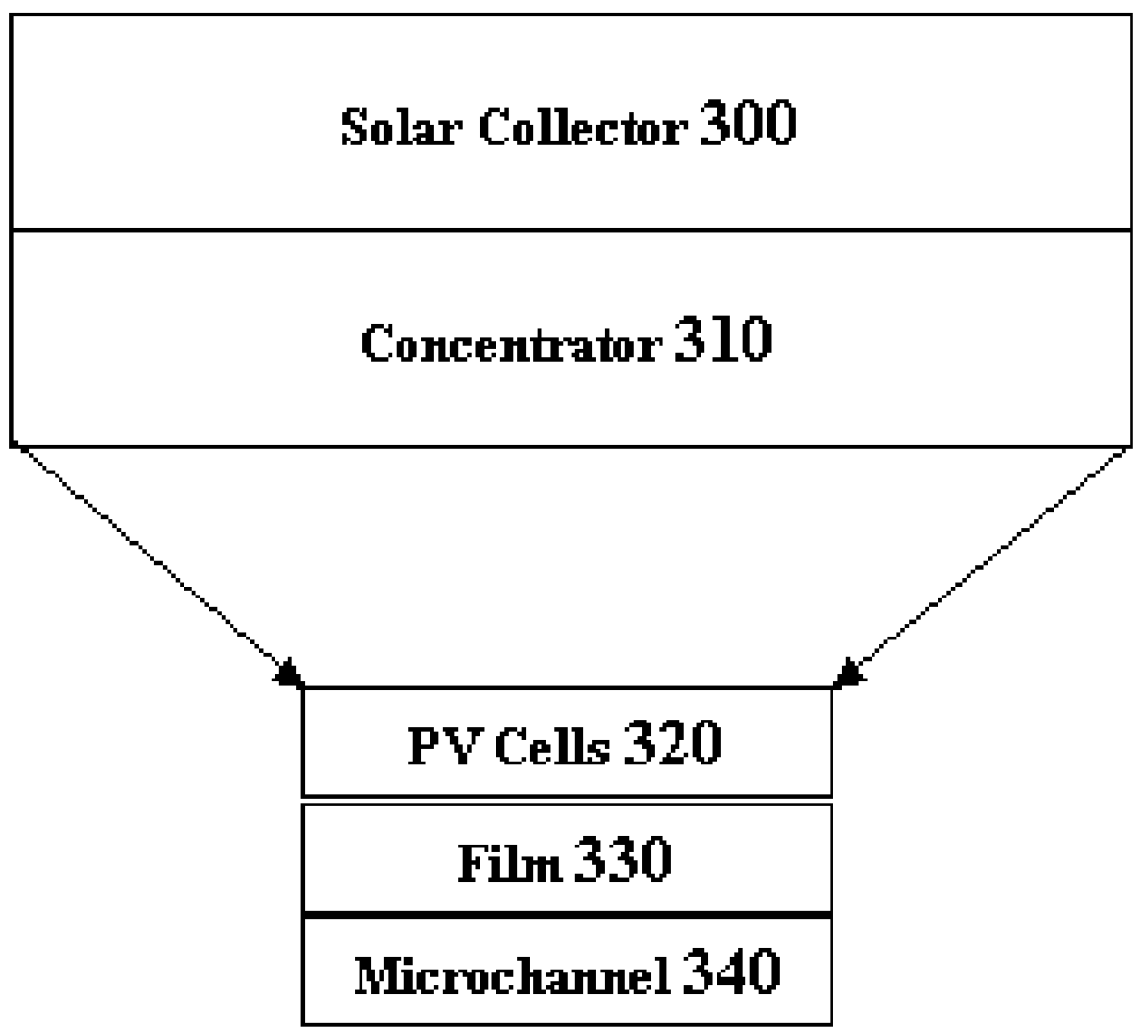
FIG. 70—A cross-sectional view of the absorption heat pump depicted with the strong solution desorption thermal energy obtained by an integral microchannel heat exchanger within solar collector.

Thermal energy of the inventive ScHPX uniquely utilizes low quality thermal sources. One such source is a non-concentrated solar collector. The more preferred solution has an integral heat exchanger within the solar collector. A more preferred implementation is a solar collector 300 as depicted in FIG. 70 that achieves at least one benefit selected from the group consisting of concentrating solar energy 310 as depicted in FIG. 70 as a means of reducing thermal losses and cooling photovoltaic cells 320 as depicted in FIG. 70. A specifically preferred implementation is an integral microchannel heat exchanger 340 as depicted in FIG. 70 to further reduce thermal losses and heat exchanger size. And the particularly preferred implementation has a translucent film 330 as depicted in FIG. 70 separating the solar collector and heat exchanger, whereby photons from the solar spectrum enable photon stimulated desorption, thus reducing the desorption temperature. Stimulated desorption is also achieved by external electrical and electromagnetic fields. The further inclusion of nanoscale powders, including quantum dots and ultraviolet absorbers, enhance efficiency whereby the colloidal dispersion of powders within the absorber enhances direct conversion of photons to electrons, and subsequent electron transmission between cathode and electrode. The optimal solution has at least one solar collector stage followed by at least one solar concentrator stage where each stage creates an independent pressure zone (i.e., a superheated vapor state).

The utilization of the inventive ScHPX as noted earlier yields higher power generating efficiency when the working fluid is further elevated to higher vapor states. The elevation of the working fluid to a first vapor state through the utilization of a relatively lower temperature heat source, such as waste heat or non-concentrated solar energy, is subsequently elevated to a higher vapor state through means including traditional vapor compressor, concentrated solar energy, a combustion source, a relatively higher temperature heat source, or a combination thereof. This elevation from one lower vapor state to subsequent higher vapor states can be repeated. The optimal energy efficiency replaces the utilization of traditional vapor compressor with staggered increases in vapor states as a means of elevating vapor state through a series of thermodynamic stages via a thermal-hydraulic compressor/pump. The utilization of a high surface area heat exchanger as an integral component of the thermal-hydraulic pressure increasing zone enables rapid increases in pressure. The ability to rapidly increase the pressure within each zone enables the expansion device to receive a working fluid with a constant pressure.

Numerous methods and devices exist to isolate one zone from the other. One such means is a valve-less hydraulic pump comprised of a rotating cylinder having microchannels on the exterior portion of the rotating cylinder. The internal part of the rotating cylinder is exposed to the thermal source. The rotating cylinder is within a further external cylinder that seals each microchannel thus isolating each zone within the microchannel from the other zones. During the period of rotation, the working fluid within the microchannel increases in both temperature and thus pressure. The fluid enters an individual microchannel, preferentially from an inlet duct that is perpendicular to the microchannel along the entire length of the microchannel. Likewise, the exit duct has the same orientation with respect to the microchannel, but offset rotationally along the cylinder.

Alternatively, the thermal-hydraulic compressor/pump incorporates a high surface area "solid"/slurry heated up to a specified temperature, that is subsequently placed into a "sealed container". The working fluid is then infused into the sealed container leading to a rapid increase in pressure. The further incorporation of a spring piston to create a counterforce, preferentially such the spring creates a constant force at least equivalent to the desired entry pressure of the expansion device. The spring further enables all of the superheated vapor to be ejected from the pressure zone and to maintain a constant pressure. The further utilization of a flexible bladder or springs enhances the constant pressure output from one pressure zone into the next or to the expansion device. A further advantage is that each pressure zone is essentially emptied for full occupancy by the prior pressure zone.

Independent pressure zones are alternatively produced by the utilization of flow control devices. One such device is a pressure relief valve. The utilization of a series of pressure relief valves, such that the cracking pressure is set incrementally to increase from the first pressure relief valve to the last with incremental increases for each pressure relief valve is an effective way to prevent backflow and to inherently controllable means to increase working fluid vapor state. The aggregate of the series of pressure relief valves within a heat exchanger is hereinafter referred to as a "pressure train" heat exchanger. Thus the pressure relief valve creates effectively independent zones within the pressure train. There are numerous methods known in the art to achieve precise and/or relative pressure control.

It is anticipated that the optimal scenario is such the last independent zone enables output flow to occur at a precise pressure, whether the pressure be controlled by an electronic pressure control in conjunction with a pressure sensor or a mechanical pressure relief valve. Such relief valve is also anticipated as being activated at a differential pressure between the prior output zone and the subsequent input zone.

Multiple parallel pressure train heat exchangers enable a constant pressure output to the power extraction device, such that an increase in either or both the number of pressure relief valves within the pressure train and/or the number of multiple parallel pressure trains leads to a most constant pressure output.

Additional devices that both create independent pressure zones include a Quasiturbine, quasiturbine used as positive displacement pump, positive displacement pump, and hydraulic pump.

Figure 80:
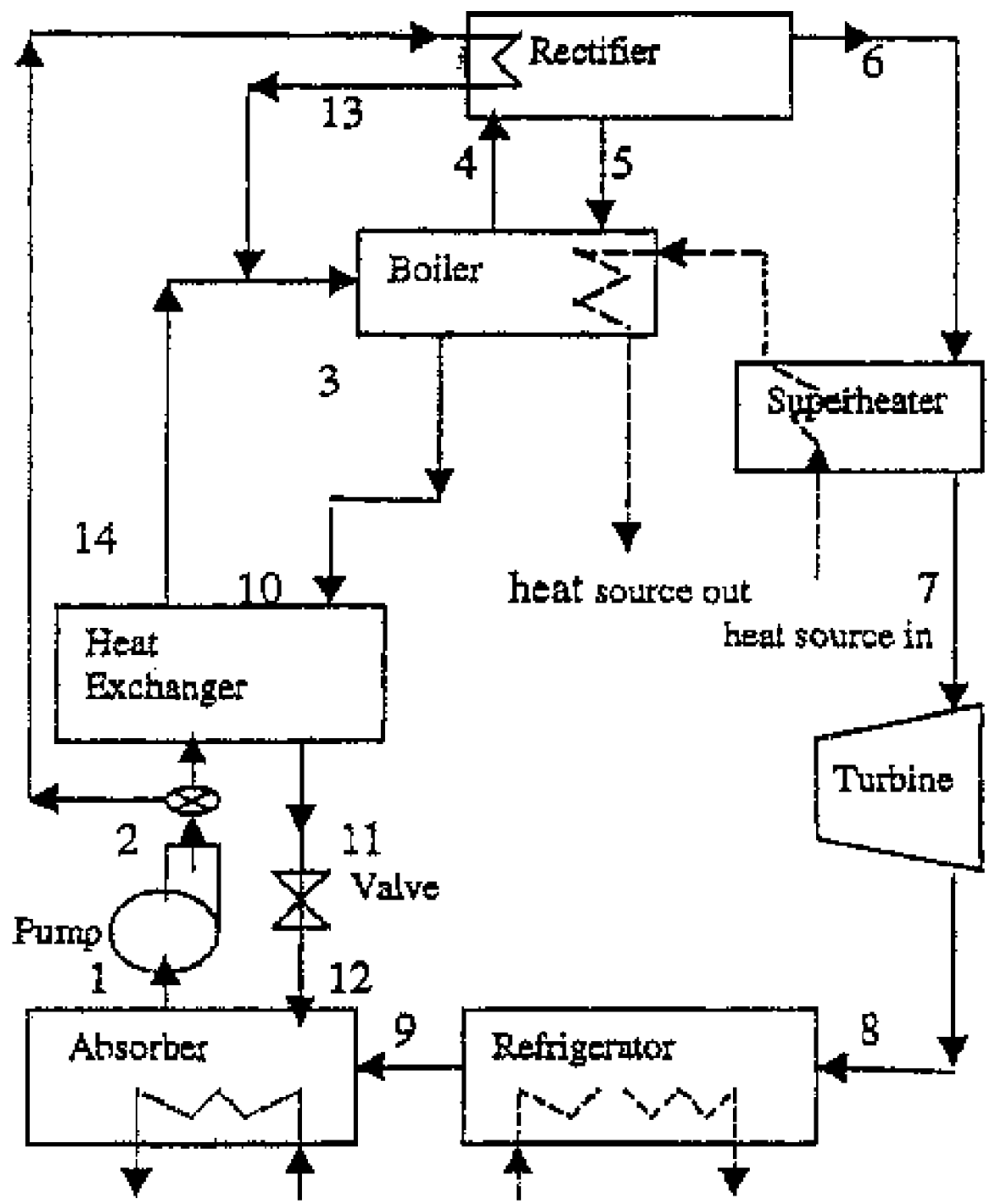
FIG. 80—A flowchart view of an absorption heat pump depicted in a Goswami cycle.
Figure 90:
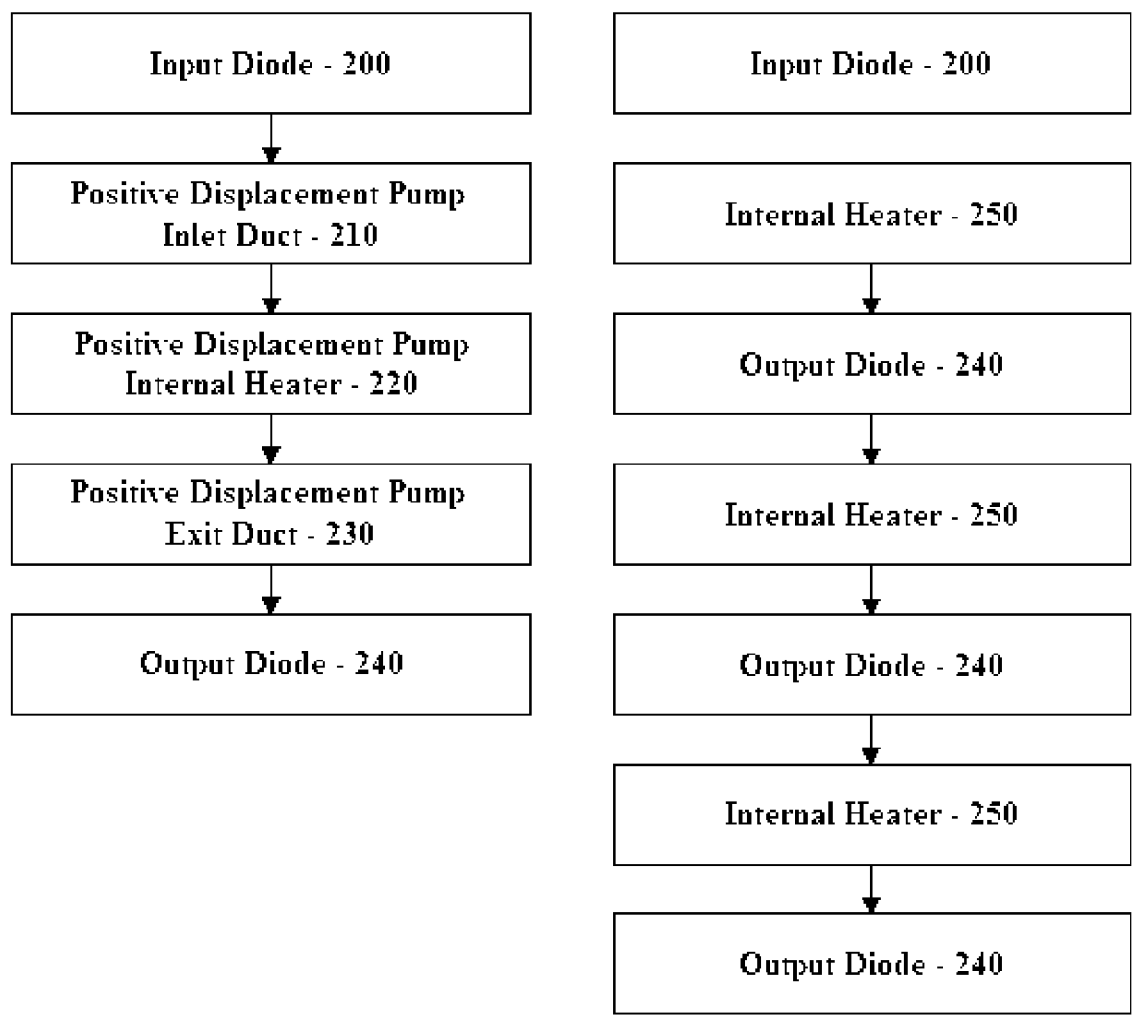
FIG. 90—A flowchart view of a thermodynamic hydraulic pump.

The final implementation feature of the ScHPX achieves higher efficiency by operating with the Goswami, Kalina, Baker, or Uehara cycle FIG. 80. Under the Goswami cycle, the ScHPX can be optimized to provide maximum levels of heating, cooling or energy, in addition to optimal total energy efficiency.

What is claimed is:

1. An absorption heat pump system whereby the heat pump system method of operation is based on thermodynamic cycles selected from the group consisting of Goswami, Kalina, Baker, or Uehara cycle, comprised of at least one working fluid selected from the group consisting of ionic liquids, ionic solids, electride solutions, and alkalide solutions.

2. An absorption heat pump system comprised of supercritical working fluids and at least one device selected from the group consisting of spinning disk reactor, thermal-hydraulic compressor including pressure train heat exchanger, a series of independent pressure stages having staggered or pulsed flow, hydraulic pump having integral thermal sink, or mechanical energy extraction device including gerotor, expansion turbine, expansion pump, Stirling cycle engine, Ericsson cycle engine, or ramjet turbine.

3. An absorption heat pump system wherein the working fluid is desorbed by at least one thermal method and at least one non-thermal method including non-thermal methods selected from the group consisting of magnetic refrigeration, vapor compression heat pump condenser, solar activated direct spectrum light absorption, electrodialysis, electrostatic fields, membrane separation, electrodesorption, pervaporation, gas centrifuge, vortex tube CO2-liquid absorber, decanting, or combinations thereof.

4. The heat pump according to claim 2 whereby the heat pump supercritical fluid is staggered or pulsed sequentially in series into at least two desorption or superheated vapor zones.

5. The heat pump according to claim 4 whereby the heat pump is further comprised of a sealed container that captures refrigerant leaked by pumping system that is periodically evacuated into the weak solution.

6. The heat pump according to claim 4 whereby the heat pump is further comprised of cavitation device that enhances absorption rate including cavitation devices selected from the category of devices that create hydrodynamic cavitation.

7. The working fluid according to claim 4, whereby the working fluid is staggered or pulsed sequentially by means void of pistons, capillary devices, or heat pipes.

8. A multistage absorption heat pump system comprised of at least one supercritical working fluid and at least one mechanical energy extraction device including gerotor, ramjet turbine, or combinations thereof.

9. The heat pump according to claim 2 wherein the combustion exhaust is infused into absorber as a means of carbon dioxide sequestration.

10. The combustion exhaust according to claim 9 whereby the combustion exhaust is treated to reduce exhaust byproducts including NO.sub.x and sulfur.

11. The heat pump according to claim 2 wherein the desorption energy is directly recovered from thermal conduction losses of a combustion recuperator.

12. The heat pump according to claim 2 whereby the heat pump is further comprised of at least one integral solar collector and at least one integral solar concentrator in series creating at least two independent pressure zones.

13. The heat pump according to claim 12 whereby the heat pump is further comprised of at least one absorber selected from the group consisting of ionic liquids, ionic solids, electride solutions and alkalide solutions.

14. An absorption heat pump system comprised of at least one working fluid having partial miscibility including means of phase separation as a function of at least one function selected from the group consisting of temperature, pressure, and pH, and at least one integral supersonic device including devices selected from the group consisting of compressor and turbine including compressors and turbines operating on either the ramjet or pulsejet principle.

15. The heat pump system according to claim 2, whereby the heat pump system method of operation is based on thermodynamic cycles selected from the group consisting of Goswami, Kalina, Baker, Uehara cycle, or derivatives thereof.

16. The heat pump according to claim 1 is further comprised of at least one nanoscale powder selected from of the group consisting of conductive, semi-conductive ferroelectric, and ferromagnetic powders including powders with nanoscale surface modifications, including surface modifications selected from the group of monolayer, and multilayers.

17. The heat pump according to claim 3 is further comprised of at least one nanoscale powder selected from of the group consisting of conductive, semi-conductive ferroelectric, and ferromagnetic powders including powders with nanoscale surface modifications, including surface modifications selected from the group of monolayer, and multilayers.

18. The heat pump according to claim 1 is further comprised of at least one working fluid having partial miscibility including means of phase separation as a function of at least one function selected from the group consisting of temperature, pressure, and pH.

19. The heat pump according to claim 2 is further comprised of at least one working fluid having partial miscibility including means of phase separation as a function of at least one function selected from the group consisting of temperature, pressure, and pH.

20. The heat pump system according to claim 1 whereby the working fluid is an electride or alkalide solution is further operable with additional thermodynamic cycles as a means of maximizing thermal energy into power generation.

21. The heat pump according to claim 3 is further comprised of at least one working fluid having partial miscibility including means of phase separation as a function of at least one function selected from the group consisting of temperature, pressure, and pH.

22. A thermal hydraulic pump comprised of a supercritical working fluid, wherein the supercritical working fluid is sequentially staggered or pulsed through a series of individual heat exchangers wherein each heat exchanger utilizes a pressure control means to increase pressure from a first pressure heat exchanger to a sequential next higher pressure heat exchanger, and wherein the pressure control means creates independent pressure zones within each heat exchanger.

23. The thermal hydraulic pump according to claim 22 whereby the supercritical working fluid is selected from the group consisting of ionic liquids, ionic solids, electride solutions, alkalide solutions, or combinations thereof.

* * * * *